United States Patent [19]
Fujimura et al.

[11] Patent Number: 4,584,979
[45] Date of Patent: Apr. 29, 1986

[54] AIR-FUEL RATIO CONTROL SYSTEM FOR AN INTERNAL COMBUSTION ENGINE WITH A THREE WAY CATALYTIC CONVERTER

[75] Inventors: Akira Fujimura, Saitama; Yoshinori Sato, Asaka, both of Japan

[73] Assignee: Honda Giken Kogyo Kabushiki Kaisha, Tokyo, Japan

[21] Appl. No.: 645,077

[22] Filed: Aug. 28, 1984

[30] Foreign Application Priority Data

Aug. 31, 1983 [JP] Japan .............. 58-135589[U]

[51] Int. Cl.⁴ .............................. F02M 1/08
[52] U.S. Cl. .................... 123/438; 123/589; 123/179 G
[58] Field of Search ............ 123/344, 438, 440, 437, 123/179 G, 589

[56] References Cited

U.S. PATENT DOCUMENTS

| 4,364,354 | 12/1982 | Kosuge et al. | 123/438 |
|---|---|---|---|
| 4,407,247 | 10/1983 | Masaki | 123/438 |
| 4,480,618 | 11/1984 | Kamifuji et al. | 123/438 |

FOREIGN PATENT DOCUMENTS 57-46052  3/1982  Japan .................. 123/344

*Primary Examiner*—William A. Cuchlinski, Jr.
*Attorney, Agent, or Firm*—Birch, Stewart, Kolasch & Birch

[57] ABSTRACT

An air-fuel ratio control system for an internal combustion engine having an oxygen concentration sensor for a feedback control of air-fuel ratio, including an intake air temperature sensing means and a control means for operating/stopping the feedback control of air-fuel ratio in accordance with the detected value of the intake air temperature. When the intake air temperature is below a predetermined level, the feedback control is stopped, and an auxiliary fuel supply means is activated, and at the same time a supply of atmospheric air into a slow speed fuel supply system of the engine is stopped. Thus, the air-fuel ratio is controlled to the rich side when the open loop control is selected, in order to secure a stable engine operation.

2 Claims, 3 Drawing Figures

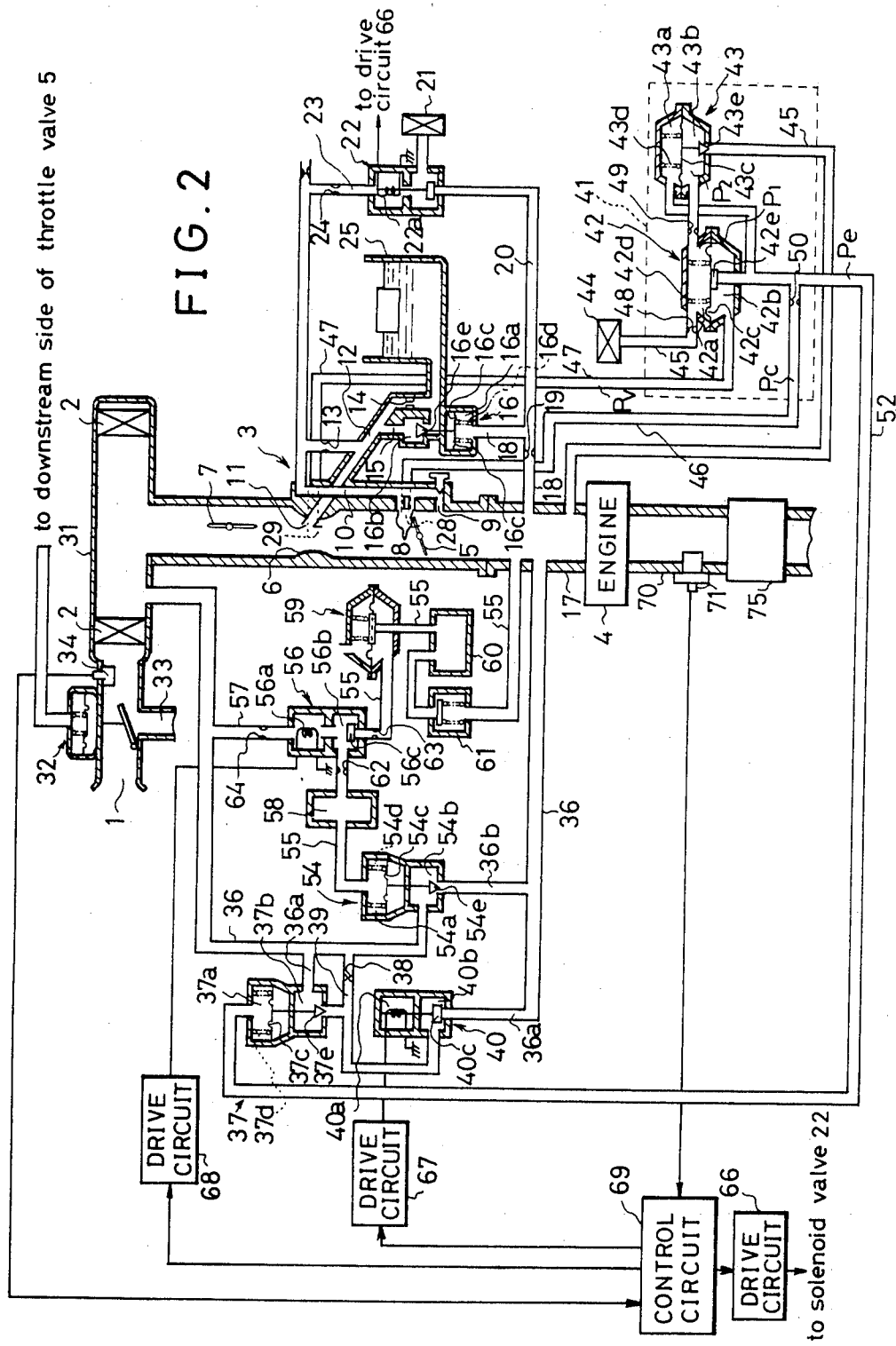

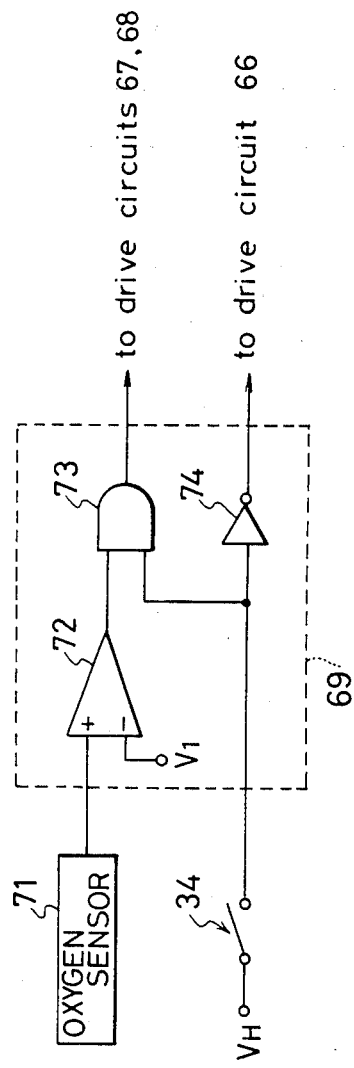

AIR-FUEL RATIO CONTROL SYSTEM FOR AN INTERNAL COMBUSTION ENGINE WITH A THREE WAY CATALYTIC CONVERTER

BACKGROUND OF THE INVENTION

1. Field of the Invention

The present invention relates to an air-fuel ratio control system for an internal combustion engine and more particularly to an air-fuel ratio control system for an internal combustion engine equipped with a three way catalytic converter for the purification of the exhaust emissions.

2. Description of Background Information

In an internal combustion engine provided with a three-way catalytic converter in the exhaust system, the air-fuel ratio of the engine is controlled around a stoichiometric value (14.7:1 for example) in accordance with the composition of exhaust gas and the operating conditions of the engine since an optimum operation of the three-way catalytic converter is enabled at the stoichiometric air-fuel ratio. The so called air intake side secondary air supply system is an example of the air-fuel ratio control system of this type. As an example, Japanese Patent Application No. 57-217548 of the present applicant discloses an air-fuel ratio control system of the air intake side secondary air supply system type. In this system, a solenoid valve is disposed in an air intake side secondary air passage leading to the intake manifold downstream from the throttle valve. The solenoid valve is open/close controlled in accordance with an output signal of an oxygen sensor disposed in the exhaust pipe. Further, a vacuum responsive air control valve is provided in the air intake side secondary air supply passage and the amount of the air flowing therethrough is controlled by supplying the air control valve with a control vacuum which is obtained by combining a vacuum in the intake manifold adjacent to or downstream of the throttle valve and a vacuum of the inside of the venturi, i.e., the so called venturi vacuum. Thus the feedback control of the air-fuel ratio is performed by controlling the amount of the air intake side secondary air.

In the air-fuel ratio control system of this type, the temperature of the engine coolant is detected and the above mentioned feedback control is started when the engine coolant temperature has reached a predetermined threshold value. When the engine coolant temperature is low, such as in a period after the cold start of the engine, the frictional resistance of the engine is relatively large and the poor atomization of fuel is likely to result in unstable engine operation. Further, the oxygen sensor is not activated in this condition. Therefore, the feedback control is stopped and the open loop control is selected to control the air-fuel ratio to the rich side. In an engine provided with an auxiliary fuel supply system such as an economizer, in order to improve the driveability and to increase the engine power, the operation of the auxiliary fuel supply system is stopped during the air-fuel ratio feedback control, and the auxiliary fuel supply system is operated to enrich the air-fuel mixture when the feedback air-fuel ratio control is stopped.

Thus, generally the open loop control is selected during a cold start period so that the air-fuel ratio of the mixture is controlled to the rich side, to stabilize the engine operation. The other reason for controlling the air-fuel ratio to the rich side during the cold start period is that the air-fuel ratio of the mixture is dependent on the density of the intake air and the air-fuel ratio of the mixture becomes lean during cold operation of the engine because of the high density of the cold intake air.

However, since the selection between the closed loop control and the open loop control is performed according to the engine coolant temperature in the conventional system, there was a problem that the engine operation becomes unstable in the event that the intake air temperature remains low even after the engine coolant temperature has reached the predetermined threshold level for starting the closed loop air-fuel ratio control.

Further, if a high threshold level of the engine coolant temperature is set for the determination of the start of the closed loop control, there will be another problem that an excessively long time is required before the start of the closed loop control, which causes the generation of undesirable emissions and a poor fuel economy.

In addition, if an automatic choke is provided to the engine having the above construction, there can be further problem that the venturi vacuum becomes excessively high if the choke valve remains closed due to the cold intake air temperature when the engine coolant temperature has reached the level to start the feedback control. Such an increase of the venturi vacuum will result in an excessive increase of the magnitude of a control vacuum to be used for the control of the air control valve and further results in an over lean mixture since the air control valve will be kept wide open.

SUMMARY OF THE INVENTION

An object of the present invention is therefore to provide an air-fuel ratio control system in which the start time of the feedback control of the air-fuel ratio is determined according to the temperature of the intake air of the engine, so as to alleviate the problems of the conventional systems and to provide a satisfactory engine operation.

According to the present invention, the feedback control of the air-fuel ratio is stopped when the temperature of the intake air of the engine is below a predetermined level and at the same time an auxiliary fuel supply means is activated and the supply of air to the fuel supply circuit of the slow speed system is stopped.

Further scope and applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

FIG. 2 is a schematic illustration of an embodiment of the air-fuel ratio control system of the present invention; and FIG. 3 is a block diagram showing the construction of the control circuit of FIG. 2.

DESCRIPTION OF A PREFERRED EMBODIMENT

Figure 1:
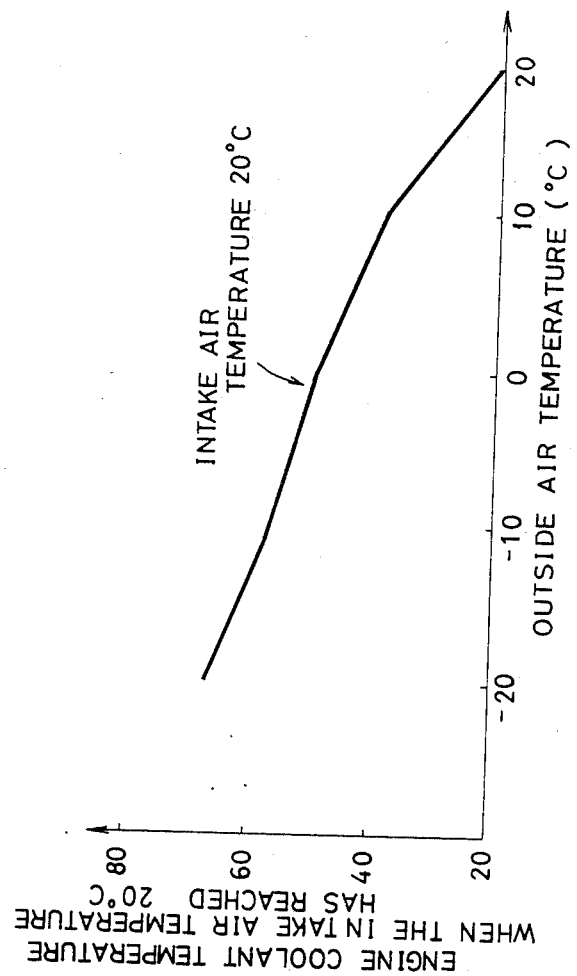
FIG. 1 is a graph showing a relationship between the engine coolant temperature and the outside air temperature, in a state when the intake air temperature has reached 20 deg. C.

Before entering into the explanation of the preferred embodiment, the problem of the conventional design of the air-fuel ratio control system will be described with reference to FIG. 1 hereinafter.

FIG. 1 is a graph showing the relationship between the engine coolant temperature and the outside air temperature in a state when the temperature of intake air in the air cleaner case, between the air cleaner element and the hot air control valve, has reached 20 deg. C. The air fuel ratio required when the intake air temperature is 20 deg. C., is around 14 through 14.7. If the feedback control is started under this state, it is possible to stabilize the engine operation and to improve the efficiency of the purification of the exhaust emissions.

On the other hand, the engine coolant temperature does not depend on the state of the intake air. Therefore, in the case of the conventional control method which is designed to start the feedback control of the air-fuel ratio when the engine coolant temperature has reached a predetermined level, for example, 40 deg. C., the engine operation may become less desirable if the engine coolant temperature differs from the outside air temperature largely. More concretely, if the engine coolant temperature has reached 40 deg. C. under a condition of the outside air temperature of −20 deg. C., the air-fuel ratio control system starts the feedback control where the air-fuel ratio is controlled to the stoichiometric value which is leaner than the required value under this condition. Thus, the engine operation becomes unstable. As another example, if the system is designed to start the feedback control when the engine coolant temperature has reached 70 deg. C., there is another problem that the time required before the engine coolant temperature reaches 70 deg. C. will be by far longer than the time required before the intake air temperature reaches 20 deg. C. If the feedback control does not start for an excessibly long time as mentioned above, the emission control characteristic of the engine will become deteriorated.

With these reasons, it can be concluded that the start time of the feedback control is determined more suitably by using the detected value of the intake air temperature rather than to use the detected value of the engine coolant temperature as was the case in the conventional systems.

Moreover, if an automatic choke valve whose opening degree is controlled according to the intake air temperature, is provided to an internal combustion engine equipped with the above mentioned air-fuel ratio control system of the air intake side secondary air supply system type, there may be a case in which the opening angle of the choke valve is smaller than a predetermined level when the engine coolant temperature has reached a level at which the feedback control of the air-fuel ratio is to be started. In such a case, the venturi vacuum becomes very high. As a result, the magnitude of the control vacuum of the air-fuel ratio control system will also become very high. This, in turn, causes the air control valve to continuously open very widely, and the air-fuel ratio becomes excessibly lean to cause unstable engine operation.

In the following explanation, it is assumed that the system is designed to start the feedback control when the engine coolant temperature has reached 40 deg. C. According to the relationship shown in FIG. 1, it is clear that the intake air temperature will reach 20 deg. C. when the engine coolant temperature has reached 40 deg. C. under a condition where the outside air temperature is at 10 deg. C. The choke valve is designed, for example, to have the opening angle of 45 deg. when the intake air temperature is 20 deg. C. Under this condition, the problem of excessively high venturi vacuum is not likely to occur. On the other hand, if the outside air temperature is lower than 10 deg. C., the intake air temperature will not reach 20 deg. C. when the engine coolant temperature has reached 40 deg. C. In such a case, the opening angle of the choke valve remains smaller than 45 deg. at the time of the start of the air-fuel ratio feedback control. Thus, the venturi vacuum will be excessively high. This problem may be avoided if the system is designed to start feedback control when the engine coolant temperature has reached 70 deg. C. For example, even under a condition of the outside air temperature of −20 deg. C., the intake air temperature will reach 20 deg. C. at the time of the start of the air-fuel ratio feedback control, and the opening angle of the choke valve will be sufficiently large to prevent the excessive rise in the venturi vacuum. However, in that case, the time required for the engine coolant temperature to reach 70 deg. C. will be much longer than the time required for the rise of the intake air temperature to 20 deg. C. As a result, the emission characteristic of the engine may become deteriorated due to the delay of the start of the feedback control. Therefore, such a design to use a high level value of the engine coolant temperature for the determination of the start of the feedback control is less practical.

The first embodiment of the present invention will be explained with reference to FIG. 2 through FIG. 3 hereinafter.

The construction of the air-fuel ratio control system of the present invention is schematically illustrated in FIG. 2. In the figure, intake air taken at an atmospheric air inlet port 1 is routed to an internal combustion engine 4 through an air cleaner 2 and a carburetor 3. The carburetor 3 has a throttle valve 5 and a venturi 6 formed upstream of the throttle valve 5. A choke valve 7 is provided upstream of the venturi 6. In the bore of the carburetor adjacent to the throttle valve 5, there are openings of a slow port 8 and an idle port 9 of a slow system fuel supply circuit which are communicated, via a slow system fuel passage 10, to a main fuel passage 12 leading to a main nozzle 11. The slow system fuel passage 10 is provided with a slow jet 13 and the main fuel passage 12 is provided with a main jet 14. An auxiliary fuel supply passage 15 is provided in such a manner as to bypass the main jet 14 and an auxiliary fuel control valve 16 is provided thereto. The auxiliary fuel control valve 16 is made up of a vacuum chamber 16a, a valve chamber 16b which forms a part of the auxiliary fuel supply passage 15, a diaphragm 16c forming a part of the vacuum chamber 16a, a valve spring 16d housed in the vacuum chamber 16a, and a tapered valve element 16e which is applied with a biasing force to close the auxiliary fuel supply passage 15 by means of the valve spring 16d through the diaphragm 16c. When a vacuum greater than a predetermined magnitude operates in the vacuum chamber 16a, then the valve element 16e will close the auxiliary fuel supply passage 15. The vacuum chamber 16a is communicated with an intake manifold 17 on the downstream side of the throttle valve 5 through a vacuum supply passage 18 having an orifice 19. The vacuum supply passage 18 on the side of the vacuum chamber 16a from the orifice 19, is communicated with an atmospheric pressure inlet port 21 through an atmospheric pressure supply passage 20. The atmospheric pressure supply passage 20 is provided with a three-way solenoid valve 22. When deenergized, the three-way solenoid valve 22 closes the atmospheric pressure supply passage 20 and the atmospheric pressure supply passage 20 on the side of the atmospheric air inlet port 21 is connected to the slow speed fuel supply passage 10 via the slow speed system auxiliary air intake passage 23. When energized, it closes the communication on the side of the slow system auxiliary air intake passage 23 and makes the communication through the atmospheric pressure supply passage 20. Further, a slow air jet 24 is provided to the slow system auxiliary air intake passage 23.

In addition, a vacuum detection hole 28 is formed in the vicinity of the throttle valve 5 in such a manner that it is located upstream of the throttle valve 5 when the throttle valve 5 is closed and located downstream of the throttle valve 5 when the throttle valve 5 is open. Further, a vacuum detection hole 29 is provided in the venturi 6. In an air cleaner case 31, a hot air control valve 32 is provided in the vicinity of the atmospheric air inlet port 1, so as to control the communication between an air intake passage from an exhaust manifold cover (not shown) and an interior of the air cleaner case 31 in accordance with the intake air temperature. Between the hot air control valve 32 and the air cleaner, there is provided an intake air temperature sensor 34 which is made up of a bimetal switch.

An air intake side secondary air supply passage 36 is provided for the communication between the intake manifold 17 and a part of the air cleaner 2 adjacent to an air outlet port formed therein. The air intake side secondary air supply passage 36 is divided into two air control passages 36a and 36b in which the secondary air flows. A first air control valve 37 is disposed in the air control passage 36a, and an air correction passage 39 with an orifice 38 is provided in such a manner as to bypass the first air control valve 37. The orifice 37 is for the idle correction. A solenoid valve 40 is provided to the air control passage 36a, downstream from the first air control valve 37.

The vacuum acting in the vacuum chamber 37a of the first air control valve 37 is controlled by a vacuum control part 41.

A second air control valve 54 is provided in the air control passage 36b. A vacuum chamber 54a of the second air control valve 54 is communicated with the part downstream from the throttle valve 5 via a vacuum supply passage 55. A three-way valve 56 is provided in the vacuum supply passage 55, and a surge-tank 58 is provided in the vacuum supply passage 55 on the side of the vacuum chamber 54a from the three-way valve 56. In the vacuum supply passage 55 on the side of the downstream portion of the throttle valve 5 from the three-way valve 56, a constant vacuum control valve 59, storage tank 60 and a non-return valve 61 are provided in this order.

The solenoids 22a, 40a, 56a are connected to a control circuit 69 respectively through drive circuits 66, 67, and 68. An exhaust gas oxygen sensor 71 provided in the exhaust manifold 70 is connected to the control circuit 69. The oxygen sensor 71 produces a voltage signal having a level $VO_2$ corresponding to the oxygen concentration in the exhaust gas, and increases as the oxygen concentration increases.

The intake air temperature sensor 34 is also connected to the control circuit 69. The intake air temperature sensor 34 produces a high level signal $V_H$ by the turn-on of a built-in bimetal switch when the intake air temperature is above a predetermined level, for example, 15 deg. C.

As shown in FIG. 3, the control circuit 69 includes a comparator for comparing the output signal level $VO_2$ of the oxygen sensor 71 with a predetermined reference level $V_1$ which corresponds to the stoichiometric air-fuel ratio, an AND circuit 73 for calculating the logical AND between the output signal level of the comparator 72 and the output signal level of the intake air temperature sensor 34, and an inverter connected to the output terminal of the intake air temperature sensor.

Since the construction of the air intake side secondary air supply system of the present air-fuel ratio control system of the invention is substantially identical to that described in the aforementioned Japanese Patent Application No. 57-217548, the explanation thereof is omitted.

The operation of the air-fuel ratio control system of the present invention having the construction described above will be explained hereinafter.

In the control circuit 69, the output signal level $VO_2$ of the oxygen sensor 71 becomes higher than the predetermined level $V_1$ ($VO_2 \geq V_1$) when the air-fuel ratio is rich. In this state, the comparator 72 produces a high level output signal. Conversely, when the air-fuel ratio is lean the level of the output signal $VO_2$ of the comparator 72 becomes lower than the level $V_1$ of the reference signal ($VO_2 < V_1$) and the comparator 72 produces a low level output signal. Assuming that the level of the intake air temperature sensor output signal is high, i.e., the intake air temperature is higher than a first predetermined temperature level $t_1$, then the change in the output signal level of the AND circuit 73 occurs in the same manner as the level change in the output signal of the comparator 72. Therefore, when the rich air-fuel ratio is detected from the output signal of the oxygen sensor 71, the output signal level of the AND circuit 73 becomes high, and the high level output signal is applied to the drive circuits 67 and 68 as a "rich signal".

The drive circuits 67 and 68 drive the solenoid values 40 and 56 in accordance with the rich signal. When the air-fuel ratio is to be controlled to the stoichiometric value by the feedback control, the solenoid valves 40 and 56 are activated and inactivated in order since the rich signals and lean signals are generated alternately and continuously. Thus, in the air control passage 36a, the flow of the secondary air is permitted intermittently by the operation of the solenoid valve 40, to perform a proportional (P) control of the amount of the secondary air. In the air control passage 36b, on the other hand, the amount of the flow of the secondary air gradually increases upon presence of the rich signal and gradually decreases upon presence of the lean signal by the operation of the second air control valve 54, to perform an integral (I) control. Since the total amount of the secondary air is the summation between the amount of the flow through the air control passage 36a and the amount of the flow through the air control passage 36b, the total amount of the secondary air will be equal to the summation between the amount under the proportional control and the amount under the integral control.

When the feedback control is effected with an intake air temperature above a predetermined level $t_1$ as mentioned above, the output signal level of the inverter 74 remains low because the output signal level of the intake air temperature sensor 34 is high. Since the solenoid valve 22 is not operated when the output signal level of the inverter 74 is low, the atmospheric air supply passage 20 is closed and at the same time the atmospheric air is introduced to the slow system auxiliary air intake passage 23. Therefore, the vacuum in the intake manifold 17 is applied to the vacuum chamber 16a of the auxiliary air control valve 16, to close same and the supply of the auxiliary fuel is stopped. On the other hand, by supplying the air into the slow system fuel supply passage 10, the fuel is atomized and supplied to the engine 4 through the slow port 8 and the idle port 9.

In the case of the cold start of the engine when the intake air temperature is lower than a predetermined level $t_1$, the bimetal switch of the intake air temperature sensor 34 is in the off position and a low level signal is produced by the intake air temperature sensor 34 and applied to the input of the AND circuit 73 as a feedback control stop signal. Thus, the output signal level of the AND circuit remains low regardless of the change in the level of the output signal of the comparator 72. Accordingly, even the air-fuel ratio is rich, the lean signal is applied to the drive circuits 67 and 68 so that the air-fuel ratio control is switched from the feedback control mode to the open loop control mode. During the open loop control mode, both solenoid valves 40, 56 are inactivated and the air intake side secondary air supply passage 36 will be closed, Therefore, the air-fuel ratio is controlled to the rich side.

On the other hand, if the intake air temperature is below the predetermined level $t_1$, the level of the output signal of the inverter 74 will then become high. By this high level output signal, the solenoid valve 22 is driven by the drive circuit 66 and the atmospheric pressure supply passage 23 becomes open to the atmosphere. At the same time, the slow system air intake passage 23 is closed. Therefore, the atmospheric pressure is applied to the vacuum chamber 16a of the auxiliary fuel control valve 16 and the valve 16 is opened so that the fuel in a float chamber 25 is drawn from the main nozzle 11 to which the fuel is supplied through the main jet 14 and the auxiliary fuel passage 15. In addition, due to the closure of this slow system air intake passage 23, the introduction of air into the slow fuel supply passage 10 is stopped, which causes the reduction of the amount of the air drawn from the slow port 8 and the idle port 9. Therefore, if the intake air temperature is below the predetermined level $t_1$, the supply of the air intake side secondary air is stopped. Further, the auxiliary fuel is supplied and the amount of the air in the slow speed fuel supply system is reduced, to cause the enrichment of the air-fuel ratio.

Subsequently, the intake air temperature is raised and when it has reached the predetermined level $t_1$, the system starts the above mentioned feedback control of the air-fuel ratio, and the air-fuel ratio is controlled to the stoichiometric value by supplying the air intake side secondary air and the supply of the auxiliary fuel is stopped.

It will be understood that, with the air-fuel ratio control system of the present invention, the start time of the air-fuel ratio feedback control is determined in accordance with the engine intake air temperature. Thus the air-fuel ratio control of the mixture to be supplied to the engine which is adapted for various operating conditions of the engine is enabled. During the time period in which the feedback control is to be stopped and a rich mixture is to be supplied to the engine, the auxiliary fuel is supplied and the supply of the air to the fuel passage of the slow speed system is stopped. Therefore, the performance and the drive ability of the engine is always maintained at good levels.

Further, there is an advantage that the construction of the system is made simple by utilizing single control valve such as the three way solenoid valve of the above described embodiment, for controlling the supply and stop of the auxiliary fuel and also for controlling the supply and stop of air in the slow speed fuel supply system. At the same time, cost down is enabled with this construction.

Further, when an automatic choke operated by the intake air temperature is employed in the internal combustion engine equipped with the air-fuel ratio control system of the air intake side secondary air supply system type as the above embodiment, an excessive increase of the venturi vacuum immediately after the start of the air fuel ratio feedback control can be prevented if the opening angle of the choke valve is adjusted so as not to cause the excessive increase of the venturi vacuum. Thus, the deterioration of the engine operation under such an operating state which might have occured can be prevented.

What is claimed is:

1. An air-fuel ratio control system for an internal combustion engine having at least one of a main fuel passage and a slow fuel passage in a fuel supply system thereof, the air-fuel ratio control system being adapted for performing a feedback control of air-fuel ratio according to a detected oxygen concentration of an exhaust gas of the engine, and comprising:
an auxiliary fuel supply means for supplying an auxiliary fuel to the engine through a fuel nozzle opening at a venturi part of a carburetor of the engine;
an intake air temperature sensing means for sensing temperature of intake air introduced to the engine; and
a control means for operating/stopping the feedback control of air-fuel ratio in accordance with the temperature of intake air sensed by said intake air temperature sensing means, said control means comprising a single control valve being adapted to stop said feedback control of air-fuel ratio and activate said auxiliary fuel supply means and to stop a supply of air into at least one of the main fuel passage and slow fuel passage, for enriching the air-fuel ratio when said temperature of intake air is below a predetermined level.

2. An air-fuel ratio control system for an internal combustion engine having a slow speed system in a fuel supply system thereof, the air-fuel ratio control system being adapted for performing a feedback control of air-fuel ratio according to a detected oxygen concentration of an exhaust gas of the engine, and comprising:
an auxiliary fuel supply means for supplying an auxiliary fuel to the engine through a fuel nozzle opening at a venturi part of a carburetor of the engine;
an intake air temperature sensing means for sensing temperature of intake air introduced to the engine; and
a control means for operating/stopping the feedback control of air-fuel ratio in accordance with the temperature of intake air sensed by said intake air temperature sensing means, said control means being adapted to stop said feedback control of air-fuel ratio and activate said auxiliary fuel supply means and to stop a supply of air into a fuel passage of the slow speed system, for enriching the air-fuel ratio when said temperature of intake air is below a predetermined level, wherein said auxiliary fuel supply means comprises a vacuum responsive control valve for controlling the supply of said auxiliary fuel in accordance with magnitude of vacuum supplied from an intake manifold to a vacuum chamber thereof, and said control means includes a three-way valve for introducing an atmospheric pressure into said pressure chamber and stopping the supply of atmospheric air into said slow speed system when the temperature of intake air is below the predetermined level.

* * * * *